Figure 1:
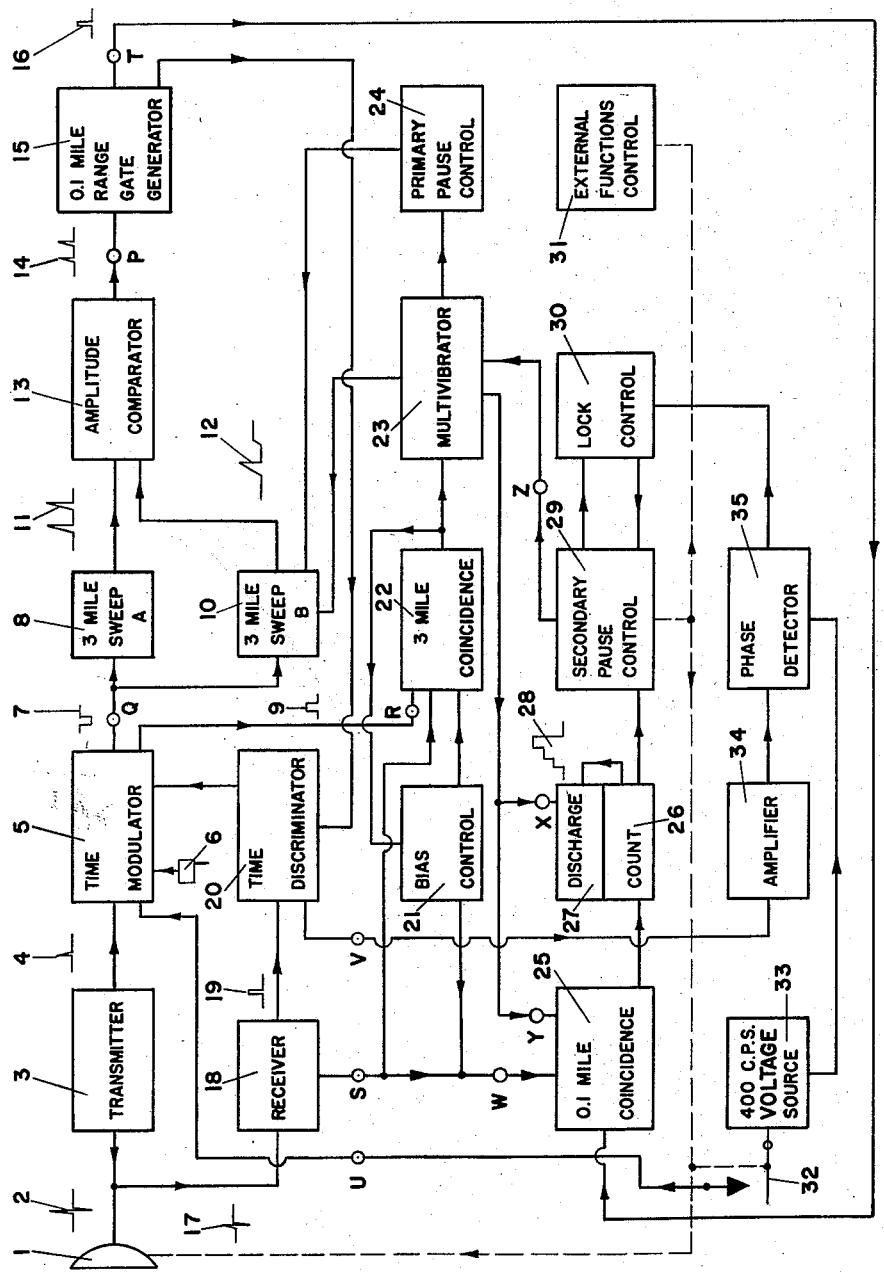

Martin R. Richmond
INVENTOR.

BY

ATTORNEY

Aug. 5, 1958      M. R. RICHMOND      2,846,676
HIGH SPEED TARGET RANGE INDICATOR
Filed Feb. 17, 1954

Martin R. Richmond
*INVENTOR.*

BY

ATTORNEY

Martin R. Richmond
INVENTOR.

ATTORNEY

Aug. 5, 1958     M. R. RICHMOND     2,846,676
HIGH SPEED TARGET RANGE INDICATOR
Filed Feb. 17, 1954     5 Sheets-Sheet 4
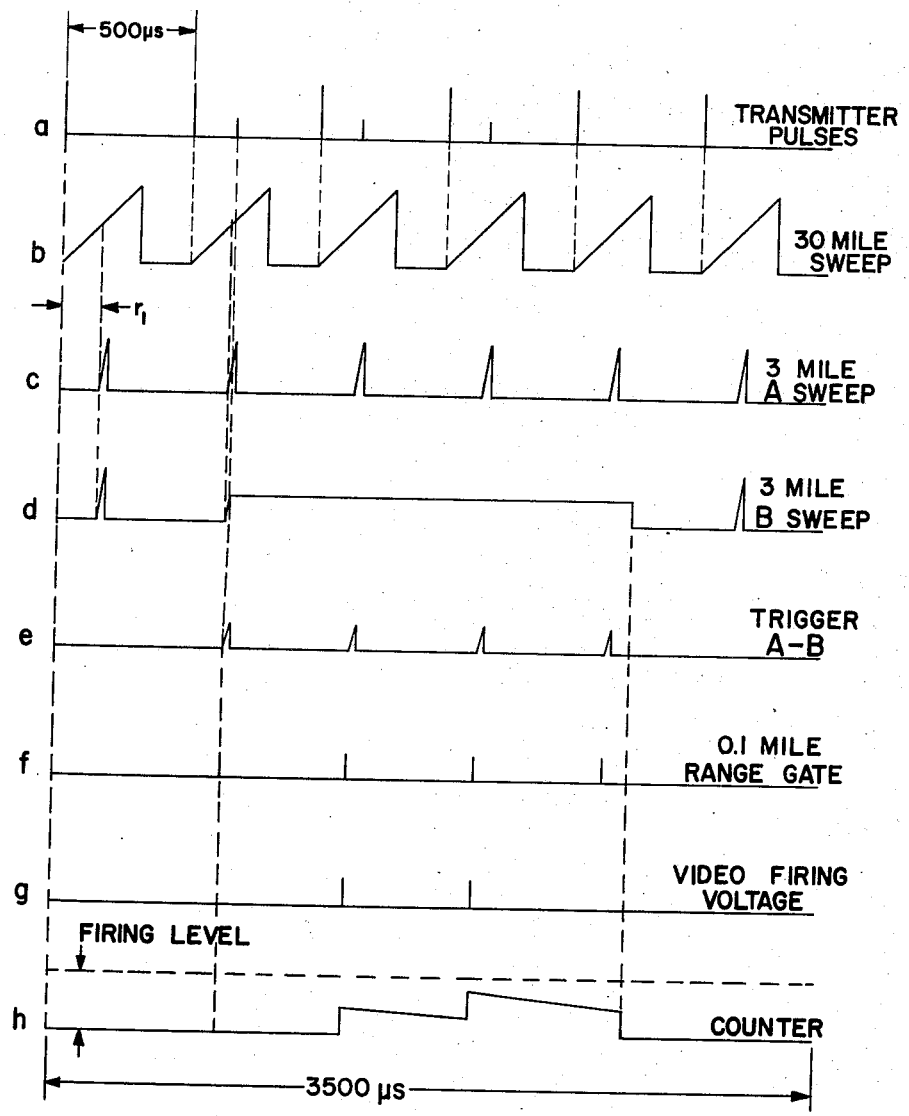
FIG. 4
Martin R. Richmond
*INVENTOR.*
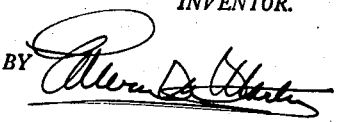
ATTORNEY United States Patent Office 2,846,676
Patented Aug. 5, 1958

2,846,676

HIGH SPEED TARGET RANGE INDICATOR

Martin R. Richmond, Nashua, N. H., assignor, by mesne assignments, to Sanders Associates, Incorporated, Nashua, N. H., a corporation of Delaware Application February 17, 1954, Serial No. 410,757

8 Claims. (Cl. 343—7.3)

This invention relates to the art of radar. It particularly relates to airborne fire control radar devices having automatic target selection and tracking systems.

The present invention applies to the general problem of detecting the presence of a target when both the target and the observer are airborne and an observing beam of electromagnetic energy is moving with respect to the observer's aircraft. Prior systems have been so designed that many false alarms are produced when no target is present. In order to decrease the number of false alarms it is necessary in conventional systems to reduce the sensitivity to the presence of a target.

It is therefore an object of the present invention to provide an improved radar system of the type described having increased sensitivity to the presence of a target;

A further object of the invention is to provide a system of the type described with improved means for selecting a true target while discriminating against false target indications; and A still further object of the invention is to provide a system of the type described having improved means for the rapid selection of a desired or true target signal.

Other objects of the invention will be apparent from the following description of a typical embodiment thereof, taken in connection with the accompanying drawings.

In accordance with this invention there is provided a radar system having means for directively radiating in a predetermined pattern and receiving pulses of high frequency electromagnetic energy and means for causing an axis of the pattern to move with respect to the system. Included in this radar system is an improved electronic control system for selecting a target and producing continuous range indications of the target. Means are provided for controlling the system to permit the detection of a target in a particular increment of a predetermined range. An examining means effects the continuous examination of the increment. A primary pause means is responsive to a pulse of the energy and enables the examining means to produce range indications of a particular target. A secondary pause means is responsive to subsequent pulses of the energy and causes the motion of the axis with respect to the radar system to be interrupted; the secondary means is enabled to function by the primary means and controls its operation. A reference means causes the time of occurrence of the operation of the examining means to be varied with respect to the time of occurrence of the received energy pulses; the secondary means enables the reference means to function. A comparison means provides a control voltage by comparing the phase of the output of the examining means with respect to the output of the reference means. A lock-on means, which is enabled to function by the control voltage, controls the operation of the secondary pause means and permits the system to provide continuous range indications of the target.

Figure 2:
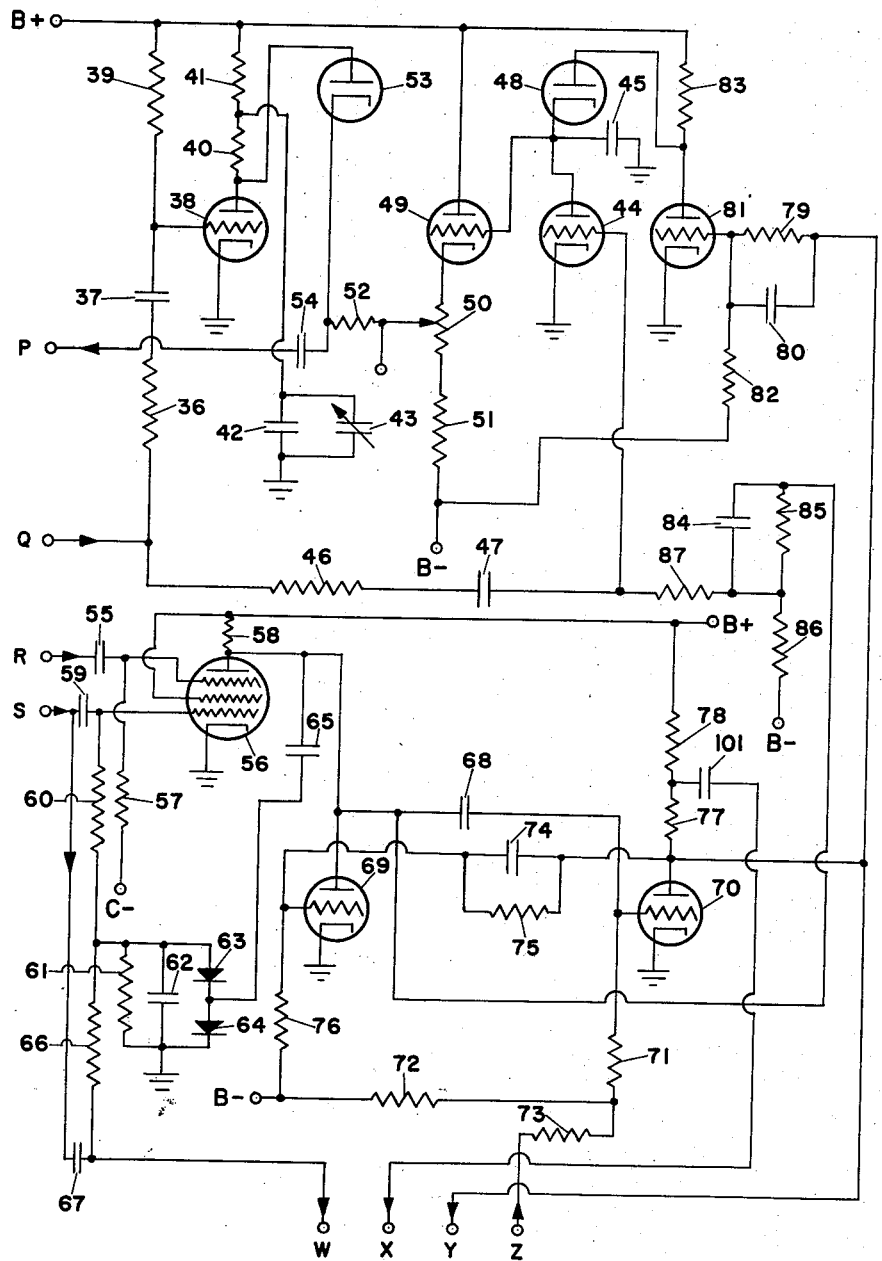
Figure 3:
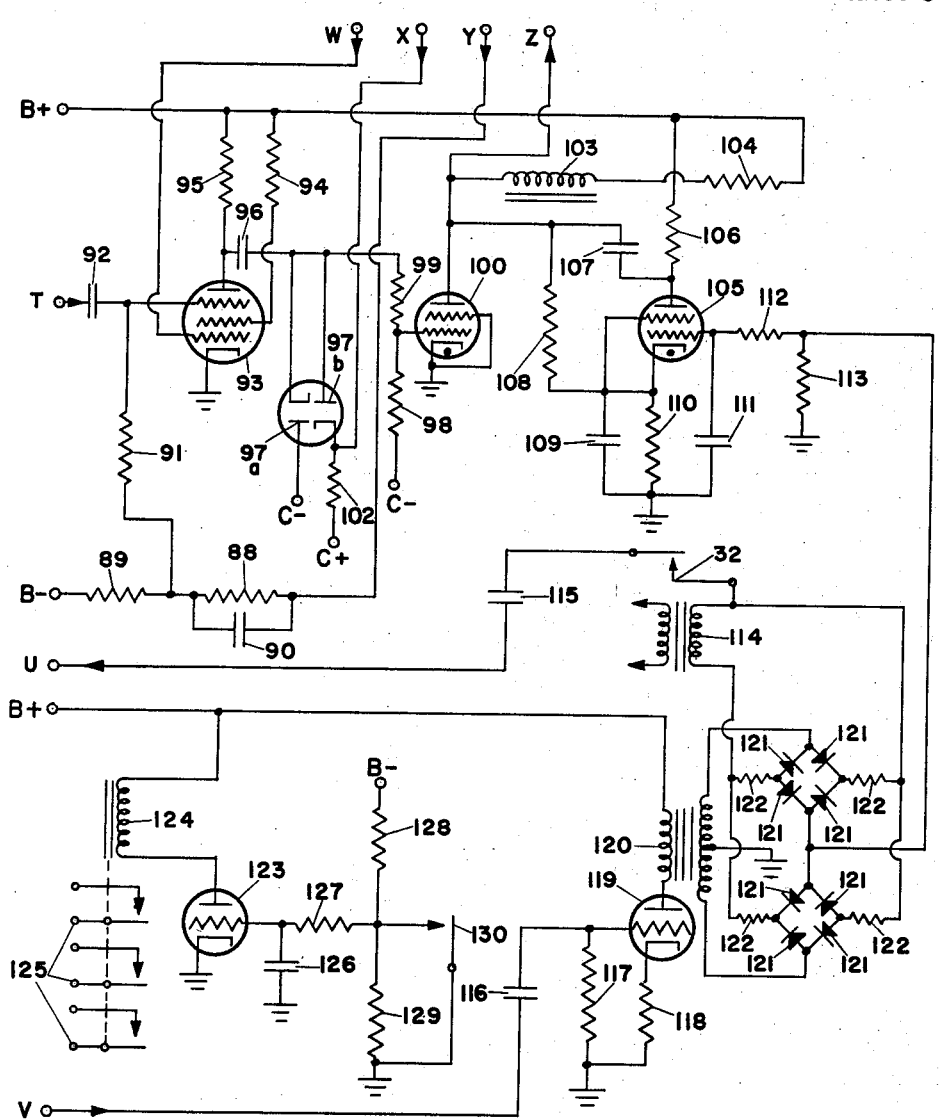
Figure 5:
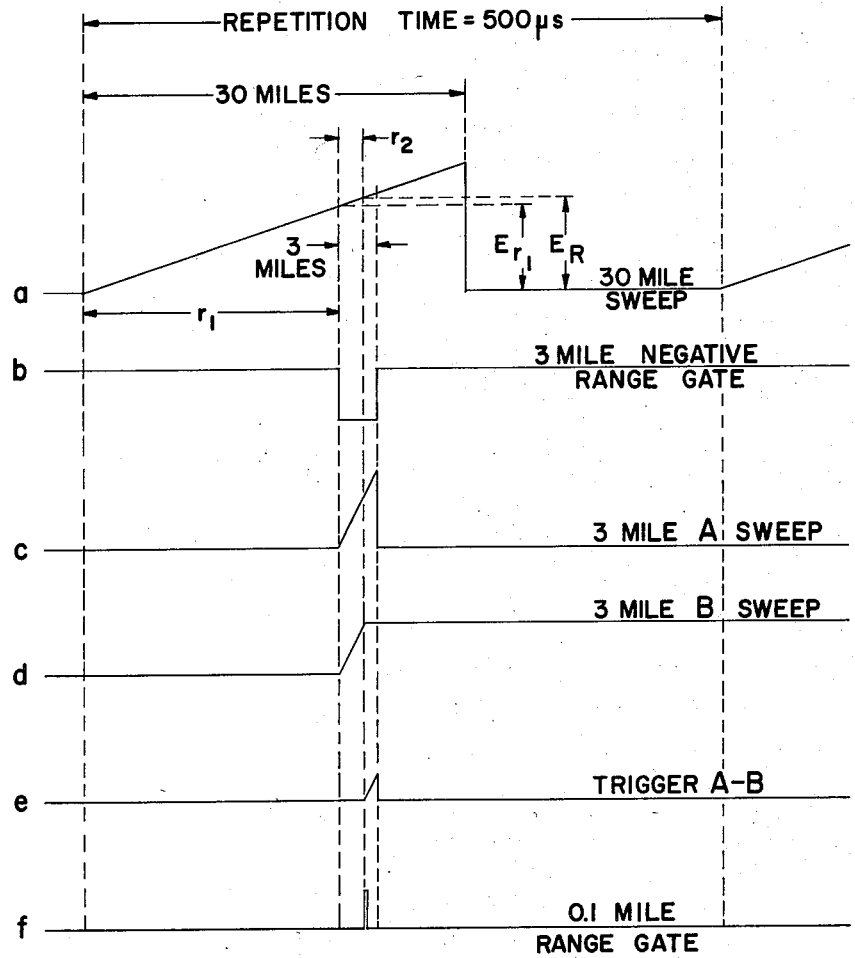

In the accompanying drawings:

In Fig. 1 there is illustrated a block diagram of a radar system embodying this invention;

In Fig. 2 there is illustrated a schematic circuit diagram of a portion of the above system;

In Fig. 3 there is illustrated a schematic circuit diagram of another portion of the above system;

In Fig. 4 there are illustrated voltage wave forms that appear in the operation of the system in Fig. 1; and In Fig. 5 there are illustrated wave forms that appear in the system above shown with respect to an expanded time base.

Referring now in more detail to the drawings, in the block diagram of Fig. 1 a transmitter 3 generates a pulse indicated at 2 of electromagnetic energy and is coupled to an oscillating antenna, such as disclosed in U. S. Patent No. 2,446,201 to Poter et al., 1 and radiated therefrom. An attendant pulse 4 simultaneously triggers the time modulator 5 which produces a sweep voltage of a time duration sufficient to permit searching a thirty mile range. By adjusting manual control 6, a particular three-mile increment of range may be selected to examine more closely for the presence of a target. The negative gate pulse 7, an output of modulator 5, has a duration equivalent to three miles of range and enables the three-mile A sweep generator 8 and B sweep generator 10 to function. The A sweep pulses 11 and B sweep pulses 12 are applied to an amplitude comparator 13. In the event of a target indication, comparator 13, in response to a voltage difference due to interrupting the B sweep, produces a trigger pulse as indicated at 14 which enables the generator 15 to produce a range gate voltage pulse having a duration equivalent to the 0.1 mile of range.

A positive gate pulse as at 9, another output of modulator 5, has a time duration equivalent to three miles of range and enables the coincidence circuit 22 to amplify for that period. Received pulses 17 are coupled to the receiver 18, amplified and detected to produce video pulses as indicated at 19. If a target is present, an output video pulse 19 is coupled to the coincidence circuit 22 and amplified to charge bias control 21 which regulates the sensitivity of the coincidence circuit 22. The coincidence circuit 22 is coupled to multivibrator 23 which inhibits the sweep generator 10 from recycling. Another output of multivibrator 23 causes primary pause control 24 to interrupt the output of generator 10. Another output of multivibrator 23 permits the 0.1 mile coincidence circuit 25 to amplify video pulses.

In the presence of a target subsequent video pulses will be amplified by coincidence circuit 25 and coupled to counter 26 to produce a stable voltage as at 28 to control the operation of secondary pause control 29. The control circuit 29 is electromagnetically coupled to an external functions control circuit 31, the oscillating antenna 1 and 400 cycles per second voltage source 33 through contact 32. In the presence of a target secondary pause control 29 permits multivibrator 23 to continue to enable primary pause control 24; lock control 30 is also enabled by control 29. The discriminator 20 is coupled through amplifier 34 to the phase detector 35 in conjunction with the 400 cycles per second output of voltage source 33. An output of detector 35 controls the operation of lock control 30.

The automatic target tracking function is effected by a servo system comprising the modulator 5, generators 8 and 10, amplitude comparator 12, generator 15 and time discriminator 20. A D. C. error signal produced by the time discriminator is applied to the time modulator 5 to correct range errors by causing the time position of the range gates 7 and 9 to be varied in accordance with the time of occurrence of the received pulses 17. The servo system described is designed to examine the three-mile range increment for the presence of the target to produce range information.

The present embodiment is designed to operate in a series of sequences which enable the system to lock on the desired target, notify the pilot of the presence of a target and minimize false alarms. The system is particularly adapted to the detection of weak target indications which are substantially concealed in background noise. In the present invention the functions of searching for a target and measuring its range are synchronous to provide a high speed search of the target which permits the reception of a number of target indications during a few milliseconds. In the prior art, the function of measurement of the range takes place at much slower rates than the search function; a single target indication may require an elapsed time of hundreds of milliseconds. Furthermore, the design of prior systems is such that any attempt at high speed range measurements might effect the complete loss of desired signal indications.

The operation of the equipment will be discussed for four conditions: no target present, primary pause, secondary pause and lock. When no target indication is present, transmitter pulses recur at 500 microsecond intervals and trigger the thirty-mile sweep pulses generated in modulator 5 as shown in the curves $a$ and $b$ of Fig. 4. In the curve $b$, $r_1$ indicates the distance from the observer to the beginning of a three-mile range increment which is being examined by the synchronous voltage outputs of generators 8 and 10 as indicated by the first voltage pulses of the curves $c$ and $d$ in Fig. 4. Since the amplitude comparator 13 is responsive to a difference between the A and B sweep voltages, it produces no output until the B sweep voltage is interrupted. The three-mile coincidence circuit 22 is enabled to amplify by the positive range gate 9. During this period noise pulses are amplified to charge bias control 21. The parameters of bias control 21 determine the sensitivity of the system to noise or target indications, and therefore, statistically determine the number of pauses per unit time that may take place.

The primary pause system includes the bias control 21, the three-mile coincidence circuit 22, multivibrator 23, and primary pause control 24. In the event of a received target indication, a video pulse is applied to the three-mile coincidence circuit 22 which has been enabled by the three-mile range gate 9. If the pulse is large enough to overcome the bias of that circuit, the one cycle multivibrator 23 is triggered.

The output of multivibrator 23 has a time duration that is chosen to permit reception of a maximum number of received target indications. Because of the motion of the antenna, the beam width, and the pulse rate frequency, that maximum number in the preferred embodiment turns out to be four pulses, as is indicated in the curve $d$, Fig. 4. If a true target is present, the multivibrator is prevented from being restored to the no-target condition by the action of the secondary pause control system. If, however, insufficient target indications are received to actuate the secondary pause control, multivibrator 23 is restored to the no-target condition as shown in the curve $d$, Fig. 4. An improvement over prior art in the signal-to-noise ratio is derived by causing the system to respond to further pulses only during the one microsecond duration of the 0.1 mile range gate rather than the 30 microseconds duration of the three-mile range gate.

A pulse from multivibrator 23 causes primary pause control 24 to interrupt the output of B sweep generator 10. Amplitude comparator 13 produces a trigger pulse 14, as shown in the curve $e$ of Fig. 4, to trigger the 0.1 mile gate generator 15. The range gate as at 16 and as shown in the curve $f$ enables the 0.1 mile coincidence circuit 25 to amplify subsequent pulses. Another output of the generator 15 is coupled to the time discriminator 20 to enable the servo system in the presence of a target.

In the curve $a$ of Fig. 5 a single thirty-mile sweep voltage pulse is shown. The voltage $E_{r_1}$ is directly proportional to the distance $r_1$. The additional distance between the end of $r_1$ and the target position is represented by $r_2$. The distance $r_1$ plus $r_2$ is equal to R, the total range from the observer to the target, and the voltage $E_R$ is directly proportional to the total range R; $E_R$ is termed the range voltage. The negative three-mile range gate is shown in the curve $b$, Fig. 5, and the relative time positions of the A and B sweeps in the curves $c$ and $d$. The difference voltage causes comparator 13 to produce the output trigger pulses as shown in the curve $e$. The resulting 0.1 mile range gate is represented in curve $f$ of Fig. 5.

The secondary pause control circuit includes the 0.1 mile coincidence circuit 25, counter circuit 26, discharge circuit 27 and secondary pause control 29. The output of coincidence circuit 25 is applied to counter 26 as shown in the curve $g$ of Fig. 4. Subsequent received target pulses cause counter 26 to produce a voltage that is proportionally additive to fire the secondary pause control 29. The curves in Fig. 4 illustrate the effect of three apparent target pulses which fall short of triggering the secondary pause control as shown in the curve $h$, Fig. 4.

The control 29 has five functions: (1) to control multivibrator 23 so as to maintain primary pause control 24 to continue to examine the target; (2) to interrupt the oscillation of antenna 1 to permit further examination of a particular target; (3) to alert the external functions control 31 to the presence of a target; (4) to alert lock control 30 to the presence of a target; and (5) to apply the output of 400 cycles per second voltage source 33 to the time modulator 5 to effect a coherence check.

The lock circuit includes the amplifier 34, detector 35 and voltage source 33. The 400 cycle per second voltage causes the three-mile range gates to be displaced in time which, in turn, causes the 0.1 mile range gate 16 to be displaced with respect to time and cause the time discriminator to produce an appropriate voltage output. The output of the time discriminator is applied to amplifier 34 and coupled to phase detector 35. Another output of the 400 cycle per second voltage source 33 is applied to the phase detector 35. In the event of a true target, the phase relationship of the two voltages applied to detector 35 will cause that circuit to produce a control voltage to inhibit lock control 30 from disabling secondary pause control 29. This has the effect of causing the system to track a particular target and produce continuous range information. After a suitable time delay, the external functions control 31 will become energized to perform such typical functions as energizing an alarm notifying the pilot of the presence of a target and applying the range information to a fire control computing device.

The portion of the system including the antenna 1, transmitter 3, time modulator 5, receiver 18, time discriminator 20 and 0.1 mile range gate generator 15, not illustrated in the schematic circuit diagrams, are conventional in circuitry.

Referring now in more detail to the schematic circuit diagrams, the three-mile A sweep generator 8 comprises the triode 38 and associated components. The negative three-mile range gate 7 is coupled from modulator 5 through point Q, voltage dropping resistor 36 and capacitor 37 to the grid of triode 38. A high positive potential is applied to the grid through resistor 39 from a source of relatively high positive voltage labeled B+. The cathode of tube 38 is grounded and its plate is coupled through voltage dropping resistors 40 and 41 to B+. Capacitors 42 and 43 are connected from the junction between resistors 40 and 41 to ground. During the time the range gate 7 is present (30 microseconds), the triode 38 is cut off and permits capacitor 42 to charge positively with respect to ground. The adjustable capacitor 43 is provided in parallel with capacitor 42 to control the slope of the output wave form. At the end of the range gate pulse 7, capacitors 42 and 43 discharge through triode 38.

The B sweep generator 10 comprises the triodes 44 and 49 and their associated components. The range gate 7 is coupled from modulator 5 through point Q, voltage dropping resistor 46, capacitor 47, to the grid of triode 44. The cathode of triode 44 is grounded and its plate is connected to a junction between capacitor 45 and the cathode of a control diode 48. The voltage that appears across capacitor 45 is coupled to the grid of triode 49, which is connected as a cathode follower amplifier. The plate of triode 49 is connected directly to B+ and its cathode is connected to a source of relatively high negative voltage labeled B— through variable resistor 50 and resistor 51.

The amplitude comparator 13 comprises the diode 53 and associated components. The B sweep sawtooth voltage is coupled through voltage dropping resistor 52 to the cathode of diode 53. Since the A sweep sawtooth voltage simultaneously is applied to the plate, the diode 53 will conduct only when, in response to a signal, a difference between the instantaneous voltages present on the plate and cathode exists. If a difference exists, the trigger pulse produced will be coupled through capacitor 54 and point P to the 0.1 mile range gate generator 15.

The three-mile coincidence circuit 25 comprises the pentode 56 and associated components. The range gate 9 is coupled from modulator 5 through point R and capacitor 55 to the suppressor grid of pentode 56 and appears across grid resistor 57 to overcome the negative bias voltage provided by a source of relatively low negative voltage labeled C—. The cathode of pentode 56 is grounded, its screen grid is connected to B+ and its plate is connected through load resistor 58 to B+.

The pentode 56 is cut off except during the period the positive three-mile range gate 9 is present. The bias control 21 comprises the rectifiers 63 and 64 and associated components in the control grid circuit of pentode 56. Video pulses, coupled from receiver 18 through point S and capacitor 59 to the control grid of pentode 56, appear across grid resistor 60 and, through bias control resistor 61, to ground. The amplified pulses are coupled through capacitor 65 and rectifier 63 to charge capacitor 62 negatively with respect to ground. Under static conditions capacitor 65 is charged positively with respect to ground through rectifier 64. Capacitor 62 discharges through resistor 61 to place a negative bias on the control grid of pentode 56 and through grid resistor 66, point W, Figs. 2 and 3, on the control grid of the 0.1 mile coincidence pentode 93. Video pulses are also coupled to pentode 93 through capacitor 67. The bias control system described above functions as a self-compensating device to maintain the gain of the system at a predetermined level. Another output of pentode 56 is directly coupled to the plate of a multivibrator triode 69.

The one cycle multivibrator 23 comprises the components associated with triodes 69 and 70. The triode 69 is normally cut off by a negative grid bias voltage from B— that is applied through its grid resistor 76. The grid is coupled to the plate of triode 70 through capacitor 74 and resistor 75. Its cathode is grounded and its plate is connected to B+ through resistor 58. The plate of triode 69 is coupled to the control grid of triode 70 through capacitor 68. The plate of triode 69 is also connected through a voltage divider, comprising resistor 85 and 86, to B—. The junction between resistors 85 and 86 is connected through resistor 87 to the grid of the B sweep generator triode 44. Capacitor 84 and resistor 85 in parallel comprise a time delay circuit.

The multivibrator is triggered by a negative video pulse of sufficient amplitude coupled from the plate of pentode 56 through capacitor 68 to the control grid of triode 70. The pulse appears across resistors 71 and 72 to cut off triode 70. As will be seen below, in response to a signal a negative pulse is produced at the plate of the secondary pause control tube 100, coupled through point Z, Figs. 2 and 3, resistor 73, and appears across resistor 72 to maintain triode 70 at cut off.

The cathode of triode 70 is grounded and its plate is connected through resistors 77 and 78 to B+. An output of triode 70 is coupled from the junction between resistors 77 and 78 through capacitor 101, points X, Figs. 2 and 3, to appear across resistor 102 in the cathode circuit of diode 97b. Another output of the triode 70 is connected to the control grid of the pause control tube 81 through resistor 79 and capacitor 80 and appears across resistor 82. Still another output of triode 70 is coupled through points Y, Figs. 2 and 3, resistor 88 and capacitor 90 and appears across resistor 89. This voltage is applied through resistor 91 to the suppressor grid of the 0.1 mile coincidence pentode 93. The grid of triode 70 is connected through resistor 71 to a source of positive voltage at the junction between resistors 72 and 73. Resistor 72 is connected to B— and 73 is connected through points Z, Figs. 2 and 3, the secondary pause control relay 103 and resistor 104 to B+.

When triode 70 is cut off in response to a signal, a negative pulse from the plate of triode 70 is coupled through resistor 85, capacitor 84 and resistor 87 to the grid of the B sweep generator triode 44. This prevents capacitor 45 from discharging through triode 44 between three-mile range gate pulses.

The primary pause control 24 comprises the triode 81 and associated components. The triode 81 is normally cut off. A positive output is coupled from the plate of triode 70 to the grid of primary pause control triode 81 to cause that tube to conduct. Its cathode is grounded and its plate is connected through resistor 83 to B+. The plate is also coupled through control diode 48 to the plate of the B sweep generator triode 44.

At the end of the three-mile range gate pulse, triode 44 conducts heavily to permit capacitor 45 to discharge through it and terminate a sawtooth voltage pulse. When the primary pause control triode 81 is caused to conduct heavily in response to a signal, the negative voltage pulse at the plate of triode 81 cuts off diode 48. Since capacitor 45 has no path for discharge (triode 44 being held at cut off by the range gate 7 and the single cycle multivibrator) a constant D. C. voltage is applied to the grid of the cathode follower triode 49 to produce a constant D. C. voltage output in the cathode circuit of that tube.

The 0.1 mile coincidence circuit 15 comprises the pentode 93 and associated components, as in Fig. 3. Its cathode is grounded and its screen grid is connected through resistor 94 B+. The 0.1 mile range gate 16 is coupled from generator 15 through point T and capacitor 92 to the suppressor grid and appears across resistors 91 and 89. As indicated above, video pulses are coupled through point W to the grid of pentode 93. The plate of the pentode 93 is connected through resistor 95 to B+. The output of the tube is coupled through capacitor 96 to the cathode of the counter diode 97a and to the plate of the discharge diode 97b. The plate of the control diode 97a is connected to C—. The cathode of discharge diode 97b is connected through resistor 102 to a relatively low positive voltage source labeled C+. The output of pentode 93 is also coupled through resistor 99 to the control grid of the secondary pulse control tube 100 and appears across resistor 98 which is connected to C—.

Since the pentode 93 is normally cut off, capacitor 96 is charged with a high positive voltage with respect to ground. During the presence of a video pulse the plate of the pentode 93 goes sharply negative and causes capacitor 96 to discharge heavily through control diode 97a. At the end of the video pulse, capacitor 96 tends to recharge very slowly through resistors 98, 99 and 95 to apply positive voltage to the control grid to the secondary pause control tube 100. If subsequent video pulses follow soon enough the action will be repeated in steps so that capacitor 96 discharges heavily during the period of video pulse and tends to restore its charge slowly, The circuit can be so designed that any number of pulses may be chosen to cause tube 100 to fire. In the event of a false target or the loss of a target, multivibrator triode 70 produces a negative pulse which is coupled through point X to the cathode of the discharge tube 97b and appears across resistor 102 to overcome the positive voltage on the cathode. The diode 97b conducts to quickly restore the charge capacitor 96.

The secondary pause control 29 comprises the tetrode gas discharge tube 100, secondary pause control relay 103 and associated components. The tube 100 is normally cut off and its cathode and number 2 grid are grounded. The plate of tube 100 is connected through the relay 103 and resistor 104 to B+. One contact of relay 103 interrupts the oscillations of antenna 1. The action of the other two contacts will be discussed below. The plate of tube 100 is coupled through capacitor 107 to the plate of the lock control tube 105 and through resistor 108 to the cathode circuit of that tube. When the tube 100 fires in response to a signal, a negative pulse is coupled through resistor 108 to permit capacitor 109 to discharge through resistor 110 and alert the lock control tube 105 to the presence of a target.

The lock control 30 comprises the gas discharge tetrode 105 and associated components. The cathode and grid #2 are connected together through resistor 110 to ground; capacitor 109 and resistor 110 in parallel form a time delay circuit and provide fixed bias to cut off the tube. The plate of tube 105 is connected through resistor 106 to B+. The control grid is connected through resistors 112 and 113 to ground. Capacitor 111 in parallel with resistors 112 and 113 comprise a low-pass filter circuit. If after tube 100 fires, capacitor 109 is permitted to discharge completely through resistor 110 lock control tube 105 will fire. The negative pulse at its plate will be coupled through capacitor 107 to quench tube 100 and restore the system to the no-target condition. If a true target is present, however, the phase detector 35 produces a negative voltage output which is applied to the control grid circuit of the tube 105 to maintain that tube cut off. The output of the phase detector 35 is applied to the control grid through resistor 112 and appears across resistor 113. The amplifier 34 comprises the triode 119 and associated components. The output of the time discriminator 20 is applied through point V and capacitor 116 to the grid of the triode 119 and appears across resistor 117 to ground. Its cathode is connected through resistor 118 to ground and its plate through the primary of transformer 120 to B+. The output of triode 119 appears across the secondary of transformer 120 and is applied to one leg of the phase detector.

The phase detector 35 comprises two full wave bridge rectifier circuits composed of selenium rectifiers 121 which, in conjunction with resistors 122, form a comparator bridge. The center tap of the secondary of transformer 120 is grounded. The 400 cycle per second voltage source comprises line transformer 114 and is coupled to the other leg of the phase detector. The 400 cycle voltage is also applied through the relay contact 32 of secondary pause control relay 103, capacitor 115 and through point U to the time modulator 5. As previously noted, the resultant output of time discriminator 20 is coupled through point V to the amplifier triode of 119 and the control voltage output of the phase detector is coupled to the grid of the lock control tube 105.

The external functions control 31 comprises the triode 123, external functions control relay 124 and associated components. The tube 123 is normally cut off by a negative voltage that is applied to the grid through resistor 127. The negative voltage is developed across resistor 129 which is connected through resistor 128 to B—. Capacitor 126 is charged negatively with respect to ground. Contact 130 of secondary pause control relay is in parallel with resistor 129. The blade of tube 123 is connected through the relay 124 to B+. When the secondary pause control relay 106 is energized, its contact 130 closes to short resistor 129 and remove the negative bias voltage source. After a time delay, capacitor 126 will discharge sufficiently to permit triode 123 to conduct and energize the relay 124. Contacts 125 of relay 124 will close to effect the external functions control.

The use of the present invention permits high speed detection of transient signal pulses and should greatly enhance the arts of radar, sonar and guided missile control.

While there has been hereinbefore described what is at present considered a preferred embodiment of the invention, it will be apparent that many and various changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

What is claimed is:

1. An electronic control system comprising a first source of voltage varying with respect to time in a predetermined manner; a second source of voltage varying with respect to time in said predetermined manner, said voltages being synchronous; means responsive to a signal for interrupting the variations of the voltage of said second source and maintaining it at its level at that time; and means responsive to differences in amplitude between said level of said interrupted voltage and the voltage of said first source for producing a control voltage varying in time with a definite relation relative to the variations of said voltage of said first source.

2. An electronic control system comprising a first source of voltage pulses having a predetermined waveform and recurrent at a predetermined rate; a second source of voltage pulses having said predetermined waveform and recurrent at said predetermined rate, corresponding pulses of said sources being synchronous; means responsive to a signal for interrupting the variations of a pulse of said second source and maintaining its voltage at its level at that time; and means responsive to differences in amplitude between said level of said interrupted pulse and the pulses of said first source for producing a control voltage varying in time with a definite relation relative to the variations of said pulses of said first source.

3. An electronic control system comprising a first source of voltage pulses having a predetermined sawtooth waveform and recurrent at a predetermined rate; a second source of voltage pulses having said predetermined sawtooth waveform and recurrent at said predetermined rate, corresponding pulses of said sources being synchronous; means responsive to a signal for interrupting a sawtooth voltage variation of a pulse of said second source and maintaining its voltage at its level at that time; and means responsive to differences in amplitude between said level of said interrupted pulse and the pulses of said first source for producing sawtooth control voltage pulses recurrent in time with a definite relation relative to the variations of said sawtooth pulses of said first source.

4. In a radar system including means for transmitting pulses of electromagnetic energy at a predetermined rate; receiving pulses of said energy reflected from a target, and automatic target range tracking, the combination of a first scanning means producing a first search control signal; an examining means to permit the detection of a target in a particular increment of a predetermined range in response to said first search control signal; means controlling said scanning means to cause said examining means to effect a continuous examination of said predetermined range; control means for producing a first control signal in response to a received pulse of said energy; a second scanning means producing a second search control signal in response to said first search control signal; and means controlling said examining means in response to said second control signal to cause said examining means to effect an examination of an increment of said range less than the first said increment and contained within the first said increment for increasing the sensitivity of the system to the presence of a target while decreasing its sensitivity to background noise.

5. An electronic control system responsive to received electromagnetic energy comprising a first means responsive to a predetermined number of cycles of said energy for providing a first control voltage; a second means, enabled to function by said first voltage and maintaining said first means operative in response to received subsequent cycles of said energy, for providing a second control voltage; and a third means actuated by said second control voltage and maintaining the continuous operation of said second means in response to further subsequent cycles of said energy indicating the presence of a desired signal.

6. An electronic control system responsive to received electromagnetic pulses comprising a first means responsive to a pulse of electromagnetic energy for providing a first control voltage; a second means enabled by said first voltage, and in response to subsequent pulses, maintaining said first means operative and providing a second control voltage; means actuated by said second control voltage and responsive to further subsequent pulses, recurrent at a predetermined rate establishing thereby a time coherence therebetween, for comparing received coherent signal pulses plus simultaneously received noncoherent noise pulses with received pulses of noncoherent noise alone to provide a third control voltage; and means responsive to said second control voltage and, in response to said third control voltage, maintaining the continuous operation of said second means indicating thereby the presence of a desired signal.

7. In a radar system having means for directively radiating in a predetermined pattern and receiving pulses of high frequency electromagnetic energy and means for causing an axis of said pattern to move with respect to said system, an electronic control system for selecting a target and producing continuous range indications of said target, comprising control means for permitting the detection of a target in a particular increment of a predetermined range; examining means for effecting a continuous examination of said increment; primary pause means enabling said examining means to produce range indications in response to a received pulse of said energy from a particular target; secondary pause means for providing a pause control voltage in response to a predetermined number of subsequent pulses of said energy to provide a momentary interruption control of the motion of said axis with respect to said radar system, said secondary means being actuated by said primary pause means and maintaining said primary pause means operative in response thereto; reference means for varying the time of occurrence of the operation of said examining means with respect to the time of occurrence of said received energy pulses, said reference means being enabled to function by said secondary means; comparison means for comparing the phase of the output of said examining means with respect to the output of said reference means to produce a phase control voltage; and lock-on means, responsive to said pause control voltage, controlling the continuous operation of said secondary pause means to provide a continuous target range indication control only in response to said phase control voltage.

8. In a radar system having means for directively radiating in a predetermined pattern and receiving pulses of high frequency electromagnetic energy and means for causing an axis of said pattern to move with respect to said system, an electronic control system for selecting a target and producing continuous range indications of said target, comprising control means for permitting the detection of a target in a particular increment of a predetermined range; examining means for effecting a continuous examination of said increment; primary pause means enabling said examining means to produce range indications from a particular target in response to a received pulse of said energy; means for varying the sensitivity of said primary pause means inversely to the rate of occurrence of primary pauses; secondary pause means for providing a pause control voltage in response to a predetermined number of subsequent pulses of said energy to provide a momentary interruption control of the motion of said axis with respect to said radar system, said secondary means being actuated by said primary pause means and maintaining said primary pause means operative in response thereto; reference means for varying the time of occurrence of the operation of said examining means with respect to the time of occurrence of said received energy pulses, said reference means being enabled to function by said secondary means; comparison means for comparing the phase of the output of said examining means with respect to the output of said reference means to produce a phase control voltage; and lock-on means, responsive to said pause control voltage, controlling the continuous operation of said secondary pause means to provide a continuous target range indication control only in response to said phase control voltage.

References Cited in the file of this patent
UNITED STATES PATENTS

| | | |
|---|---|---|
| 2,495,753 | Mozley | Jan. 31, 1950 |
| 2,639,419 | Williams | May 19, 1953 |